US008669916B2

(12) United States Patent
Chan et al.

(10) Patent No.: US 8,669,916 B2
(45) Date of Patent: Mar. 11, 2014

(54) VERTICALLY INTERLEAVED DISTRIBUTED ANTENNA SYSTEM

(75) Inventors: Phillip Man Wai Chan, Toronto (CA); Marc-Eric Thomas Draper, Brampton (CA); Peng Chen, Scarborough (CA); Phing Chu Chang, Toronto (CA)

(73) Assignee: Rogers Communications Inc., Toronto, Ontario (CA)

( * ) Notice: Subject to any disclaimer, the term of this patent is extended or adjusted under 35 U.S.C. 154(b) by 280 days.

(21) Appl. No.: 13/218,975

(22) Filed: Aug. 26, 2011

(65) Prior Publication Data

US 2013/0050054 A1 Feb. 28, 2013

(51) Int. Cl.
*H01Q 21/00* (2006.01)
*H04W 4/00* (2009.01)

(52) U.S. Cl.
USPC ......... 343/893; 343/853; 343/810; 455/422.1

(58) Field of Classification Search
None
See application file for complete search history.

(56) References Cited

U.S. PATENT DOCUMENTS 6,449,477 B1 9/2002 Weissman
2007/0121573 A1* 5/2007 Zuckerman et al. .......... 370/350
2008/0160986 A1* 7/2008 Oh et al. .................... 455/422.1
2009/0061939 A1* 3/2009 Andersson et al. ........ 455/562.1
2009/0224995 A1* 9/2009 Puente et al. ................. 343/850
2011/0069633 A1* 3/2011 Schmidt et al. ............... 370/254
2011/0201368 A1 8/2011 Faccin et al.
2013/0038506 A1* 2/2013 Johansson et al. ............ 343/893

OTHER PUBLICATIONS

Lofberg, "Rolling out LTE: The importance of in-building", Teletimes, vol. 5, Issue 12, Jan. 14, 2011, pp. 31-32. Available at: http://tletimesinternational.com/documents/teletime_dec_2010.pdf p. 31, last two paragraphs and p. 32, senario 4.
PCT International Search Report and Written Opinion relating to application No. PCT/CA2011/050520 dated May 14, 2012.

* cited by examiner

*Primary Examiner* — Trinh Dinh
(74) *Attorney, Agent, or Firm* — Rowand LLP

(57) ABSTRACT

A vertically interleaved in-building distributed antenna system is described. The in-building distributed antenna system includes a multiple-input and multiple-output (MIMO) radio. The MIMO radio includes a first branch connector and a second branch connector. The in-building distributed antenna system further includes a first branch transport medium coupled to the first branch connector and a second branch transport medium coupled to the second branch connector. The in-building distributed antenna system further includes a plurality of antennas. The plurality of antennas includes one or more first branch antennas coupled to the first branch transport medium and one or more second branch antennas coupled to the second branch transport medium. The first branch antennas are vertically interleaved with the second branch antennas in the structure.

19 Claims, 8 Drawing Sheets

VERTICALLY INTERLEAVED DISTRIBUTED ANTENNA SYSTEM

TECHNICAL FIELD

The present disclosure relates to antenna systems and, more particularly, to in-building distributed antenna systems.

BACKGROUND

Buildings and other structures sometimes present challenges for wireless signal distribution. Features in such buildings, such as walls, ceilings, doors and furniture, may attenuate a wireless signal making wireless reception unreliable within all areas of the building. For example, cellular reception may be unavailable within at least a portion of a building due to the attenuation of building materials.

To provide greater wireless signal coverage, buildings are sometimes equipped with an in-building distributed antenna system (DAS). A distributed antenna system is a network of spatially separated antenna nodes which are connected to a common source via a transport medium. The antenna nodes serve to increase the wireless coverage area within the building.

In-building distributed antenna systems have been designed to work with single input, single output (SISO) wireless technologies. However, such single input, single output wireless technologies are relatively slow.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
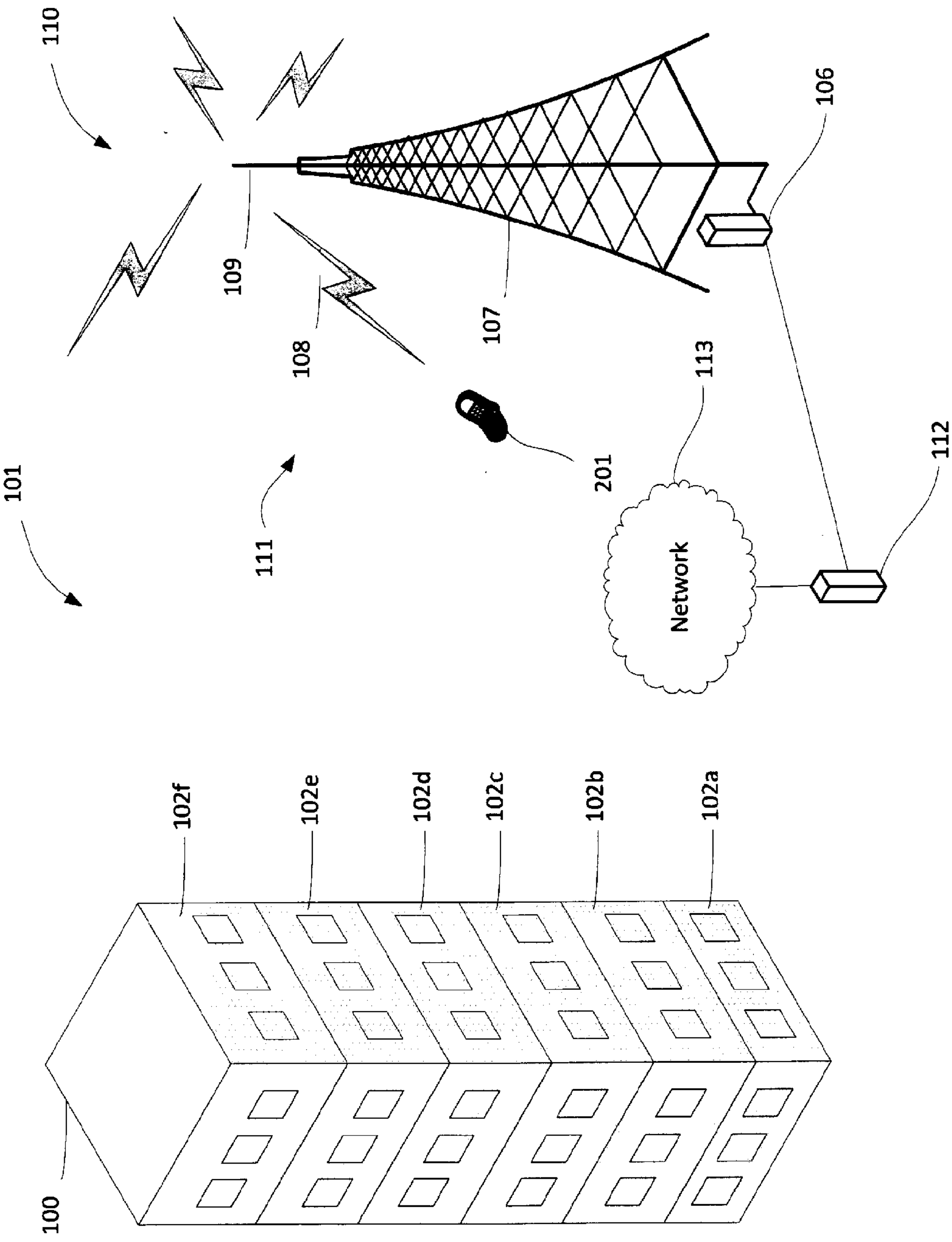
FIG. 1 is an isometric view of an operating environment in which example embodiments of the present disclosure may be applied.

In one aspect, the present disclosure describes an in-building distributed antenna system for providing wireless coverage within a coverage area which includes at least a portion of a structure. The in-building distributed antenna system includes a multiple-input and multiple-output (MIMO) radio. The MIMO radio includes a first branch connector and a second branch connector. The in-building distributed antenna system further includes a first branch transport medium coupled to the first branch connector and a second branch transport medium coupled to the second branch connector. The in-building distributed antenna system further includes a plurality of antennas. The plurality of antennas includes one or more first branch antennas coupled to the first branch transport medium and one or more second branch antennas coupled to the second branch transport medium. The first branch antennas are vertically interleaved with the second branch antennas in the structure.

In another aspect, the present disclosure describes a method of providing wireless coverage within a coverage area which includes at least a portion of a structure. The method includes: providing a multiple-input and multiple-output radio comprising a first branch connector and a second branch connector; connecting a first branch transport medium to the first branch connector; connecting a second branch transport medium to the second branch connector; and selectively connecting one or more antennas to the first branch transport medium to create one or more first branch antennas and selectively connecting one or more antennas to the second branch transport medium to create one or more second branch antennas which are vertically interleaved with the first branch antennas.

In yet another aspect, the present disclosure describes a method of converting a single input single output in-building distributed antenna system to a multiple input multiple output in-building distributed antenna system. The single input single output in-building distributed antenna system includes a single-input and single output radio comprising a first branch connector connected to a first branch transport medium. The first branch transport medium includes a first branch backbone transport medium connected to the first branch connector and a plurality of floor distribution transport mediums connected to the first branch backbone transport medium and to a plurality of antennas distributed on a plurality of floors. At least some of the plurality of floor distribution transport mediums which are connected to the first branch backbone medium are located on adjacent floors. The method comprises: disconnecting the single-input and single output radio from the first branch backbone transport medium; providing a multiple-input and multiple-output radio comprising at least two branch connectors including a first branch connector and a second branch connector; connecting the first branch backbone transport medium to the first branch connector; connecting a second branch backbone transport medium to the second branch connector; selectively disconnecting floor distribution transport mediums from the first branch backbone transport medium and connecting such floor distribution transport mediums to the second branch backbone transport medium to vertically interleave floor distribution transport mediums which are connected with the first branch backbone transport medium and floor distribution transport mediums which are connected with the second branch backbone transport medium.

In one aspect, the present disclosure describes an in-building distributed antenna system for providing wireless coverage within a coverage area which includes at least a portion of a structure. The portion of the structure includes at least a portion of two adjacent floors. The in-building distributed antenna system comprises a multiple-input and multiple-output radio comprising a first branch connector and a second branch connector. The in-building distributed antenna system further comprises a first branch transport medium coupled to the first branch connector and a second branch transport medium coupled to the second branch connector. The in-building distributed antenna system further comprises a plurality of antennas comprising at least one first branch antenna which is connected to the first branch transport medium and at least one second branch antenna which is connected to the second branch transport medium. At least one of the first branch antennas is disposed on one floor of the structure and at least one second branch antenna is disposed on another floor of the structure which does not have a second branch antenna disposed thereon but which is within a coverage area of the first branch antenna.

Other example embodiments of the present disclosure will be apparent to those of ordinary skill in the art from a review of the following detailed description in conjunction with the drawings.

Referring to FIG. 1, an isometric view of an example operating environment 101 in which example embodiments of the present disclosure may be applied is illustrated. The operating environment 101 includes a structure 100, such as a building. The structure 100 is a multi-floor structure which, in the example embodiment illustrated in FIG. 1, is a high-rise building. The structure 100 may, for example, be a residential structure such as an apartment building, a commercial structure such as an office building, an industrial structure such as a factory building, an event center such as a stadium, arena, concert hall, opera house, etc., a retail structure such as a shopping mall, or a mixed use structure. Other types of structures are also possible.

In the example illustrated, the structure 100 is generally shaped as a rectangular prism. However, the embodiments described in the present disclosure may be applied to structures 100 which take other forms.

In at least some example embodiments, the structure 100 includes a plurality of floors 102*a*, 102*b*, 102*c*, 102*d*, 102*e*, 102*f*. To illustrate the multi-floor nature of the structure 100 of FIG. 1, each floor 102*a*, 102*b*, 102*c*, 102*d*, 102*e*, 102*f* has been illustrated to include a set of windows. Also, to illustrate the multi-floor nature of the structure 100 of FIG. 1, a demarcating line has been drawn on the exterior surface of the structure 100 of FIG. 1 at the location where structural features (such as a floor and ceiling) may separate the floors 102*a*, 102*b*, 102*c*, 102*d*, 102*e*, 102*f*.

In the illustrated example, the structure 100 includes six floors: a first floor 102*a* (which may also be referred to as a bottom floor 102*a*) located at the bottom of the structure, a second floor 102*b* located adjacent to the first floor 102*a* and immediately above the first floor 102*a*, a third floor 102*c* located adjacent to the second floor 102*b* and immediately above the second floor 102*b*, a fourth floor 102*d* located adjacent to the third floor 102*c* and immediately above the third floor 102*c*, a fifth floor 102*e* located adjacent to the fourth floor 102*d* and immediately above the fourth floor 102*d*, and a sixth floor 102*f* (which may also be referred to as a top floor 102*f*) located adjacent to the fifth floor 102*e* and immediately above the fifth floor 102*e*. The structure 100 may, however, include a greater or a fewer number of floors than the structure 100 illustrated in FIG. 1.

The example embodiments described herein may be used to distribute a wireless signal to at least a portion of the interior of the structure 100. The wireless signal may be provided by a wireless communications system 110 which is configured to provide wireless communication services to wireless communication devices 201 which operate within a coverage area associated with the wireless communications system 110. In at least some example embodiments, the wireless communications system 110 is configured to communicate with the wireless communication devices 201 using a multiple-input, multiple output (MIMO) communication protocol such as Wi-Fi™ (such as the Institute of Electrical and Electronic Engineers (IEEE) 802.11n standard), the 4G standard, the Long Term Evolution (LTE) standard such as the 3GPP Long Term Evolution (LTE) standard, the Worldwide Interoperability for Microwave Access (WiMAX) standard or the Evolved High-Speed Packet Access (HSPA+) standard. Other MIMO based communications protocols, including variations and evolutions of the standards described above may also be used.

MIMO involves the use of multiple antennas at both a transmitter and a receiver to improve communication performance. MIMO may be used in the wireless communications system 110 to provide increases in data throughput and link range. This may be achieved through spectral efficiency and link reliability or diversity.

In at least some example embodiments, the wireless communications system 110 may also be configured to also provide communications according to non-MIMO based communication protocols in addition to MIMO based communications. For example, the wireless communications system 110 may provide communications according to analog, digital or dual-mode communications system standards such as, for example, the Frequency Division Multiple Access (FDMA) standard, the Code Division Multiple Access (CDMA) standard, the Wideband CDMA (WCDMA) standard, the Global System for Mobile Communications (GSM) standard, the Enhanced Data GSM Environment (EDGE) standard, the Universal Mobile Telecommunications System (UMTS) standard. Other communications protocols, including variations and evolutions of the standards described above may also be used.

The wireless communication devices 201 which are configured to communicate with the wireless communications system 110 may include any electronic devices that are configured for wireless communications using a communication protocol provided by the wireless communications system 110. In various example embodiments, the wireless communication devices 201 may include, for example, a cellular phone, a smartphone, a personal computer, a tablet computer, a gaming device, an audio or video player (such as a television or MP3 player), a navigational device (such as a global positioning system (GPS) device), a wireless peripheral (such as a printer), or a pager. Other types of wireless communication devices 201 apart from those specifically listed above may also be used in the wireless communications system 110.

In at least some example embodiments, such as the example embodiment illustrated in FIG. 1, the wireless communications system 110 may be a cellular communications network. The cellular communications network includes at least one communications site 111 which transmits and receives a cellular wireless signal 108. The communications site 111 may be a fixed-location communications site 111 such as a cell site or base station. The communications site 111 provides radio coverage over an associated geographic area, which may be referred to as a cell. The communications site 111 may provide wireless communication services for wireless communication devices 201 located within the coverage area of the communications site 111. The communications site 111 includes a transceiver 106 which is electrically connected to an antenna 109. The antenna 109 may be mounted on an antenna support structure 107, such as a tower or a building.

The wireless communications system 110 will also include other communications sub-systems 112 which have, for the purpose of illustration, been displayed in block form. It will be appreciated that these communications sub-systems 112 will generally take other forms and that various components of the communications sub-systems 112 may be physically or logically separated from one another. By way of example, the communications sub-systems 112 may include communication equipment such as servers, routers and systems which are configured to provide wireless services to the wireless communication devices 201. Such wireless services may include voice communication services which permit the wireless communication device 201 to audibly communicate with other devices. The wireless services may also permit wireless communication devices 201 to transmit other data to other devices. In at least some example embodiments, the communications sub-system 112 is connected to a network 113, which may include the Internet. The communications sub-systems 112 may provide network connectivity to wireless communication devices 201 to allow such devices to access network connected systems and devices, such as content servers.

The structure 100 may include various features which act to attenuate a wireless signal (such as the cellular wireless signal 108). For example, walls, ceilings, doors and furniture may attenuate a wireless signal. Due to such attenuation, the structure 100 may have one or more zones where reception of cellular wireless signals 108 from external communication sites 111 may be poor.

Figure 2:
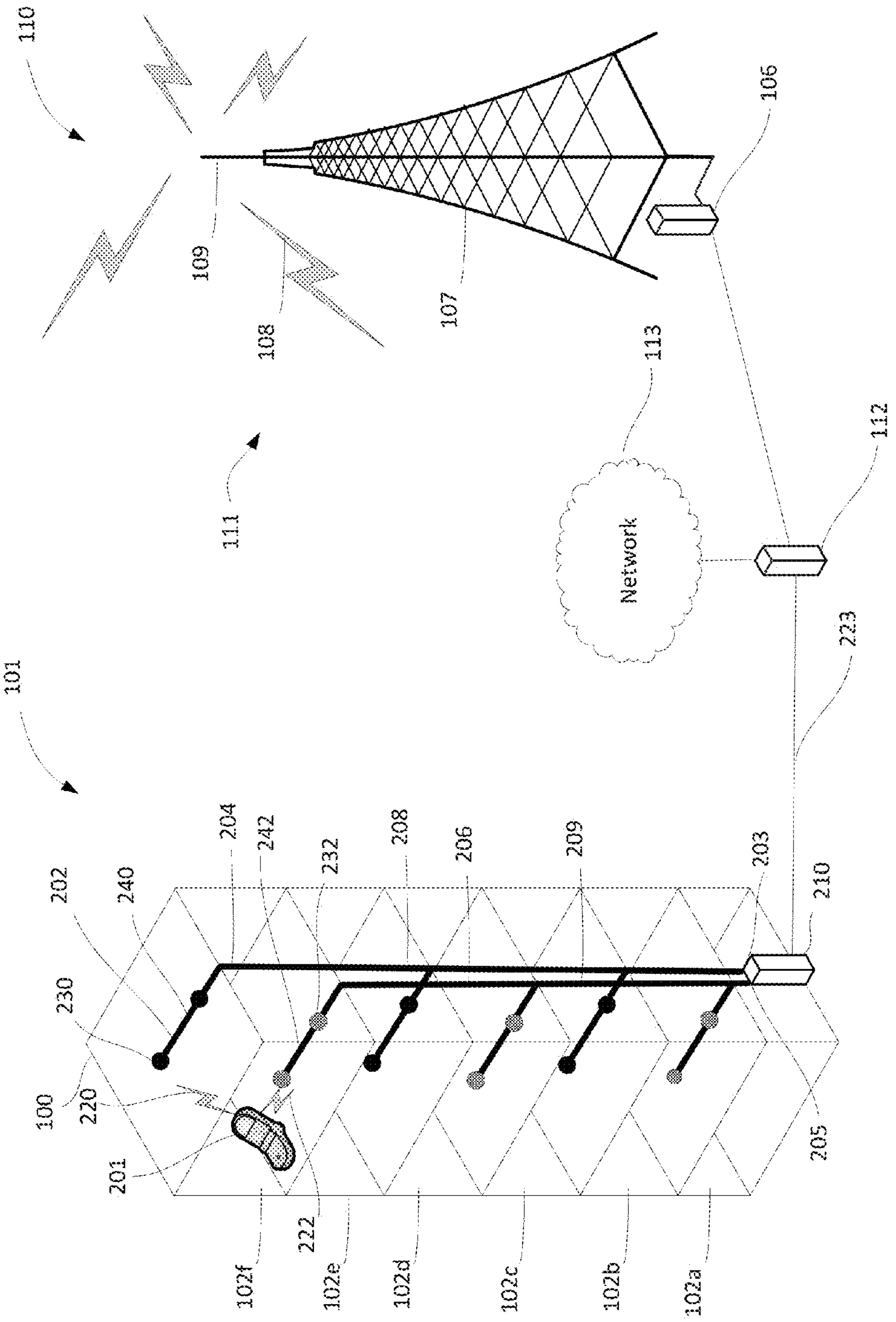
FIG. 2 is an isometric view of an operating environment illustrating an in-building distributed antenna system in accordance with example embodiments of the present disclosure.
Figure 3:
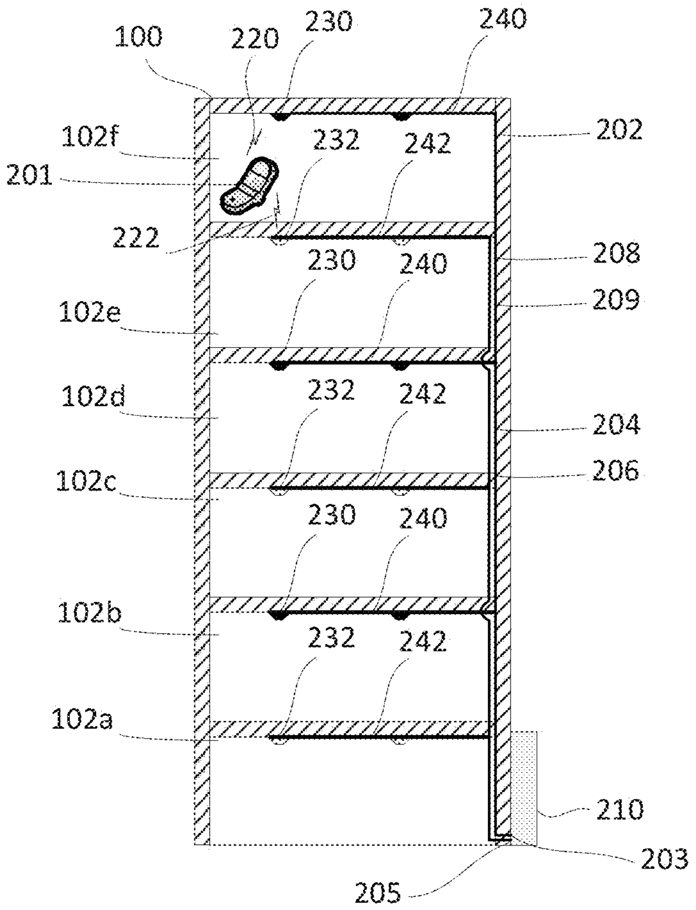
FIG. 3 is a front view of a structure illustrating the in-building distributed antenna system of FIG. 2.

Referring now to FIGS. 2 and 3, in order to provide wireless coverage within the structure 100, the wireless communications system 110 includes an in-building distributed antenna system 202. The in-building distributed antenna system 202 may, in some example embodiments, be configured to provide wireless coverage to all internal areas of the structure 100. In other example embodiments, the in-building distributed antenna system 202 may provide wireless coverage within only a portion of the structure 100, such as, for example, a dead zone within the structure 100 where external communication sites 111 do not provide reliable wireless coverage. Such a dead zone may exist, for example, near the center of the structure 100, away from the structure's extremities.

In order to better illustrate the in-building distributed antenna system 202, in FIG. 2, the external walls of the structure 100 have been removed from the illustration. That is, FIG. 2 illustrates an isometric view of the operating environment 101 in which the external walls of the structure 100 have been removed to better illustrate the in-building distributed antenna system 202. FIG. 3 illustrates a front view of the structure 100 of FIG. 2 to further illustrate the in-building distributed antenna system 202.

The in-building distributed antenna system 202 provides MIMO wireless coverage within a coverage area which includes at least a portion of a structure 100. More particularly, the in-building distributed antenna system 202 provides MIMO wireless coverage within a portion of at least two adjacent floors of the structure 100. In the example embodiment illustrated, the in-building distributed antenna system 202 provides MIMO wireless coverage over all six floors 102*a*, 102*b*, 102*c*, 102*d*, 102*e*, 102*f* of the structure 100. An example wireless communication device 201 has been illustrated on the sixth floor 102*f* (i.e. the top floor) to illustrate the operation of the in-building distributed antenna system 202 to provide MIMO wireless communications to a wireless communication device 201.

The in-building distributed antenna system 202 includes a multiple-input and multiple-output (MIMO) radio 210. In the example embodiment illustrated in FIG. 2, the wireless communications system 110 is a cellular communications network and the MIMO radio 210 is connected to the communications sub-systems 112. The MIMO radio 210 may be connected to the communications sub-system 112 via a wired transport medium 223 such as, for example, fibre optic cabling. The MIMO radio 210 may, in other example embodiments, be connected to the communications sub-system 112 via wireless communications. For example, the MIMO radio 210 may be connected to the communication sub-systems 112 through wireless communications via a communications site 111 which has a coverage area that includes the area in which the MIMO radio 210 is located.

In the example illustrated, the MIMO radio 210 is illustrated as being located at the exterior of the base of the structure 100 (i.e. near the first floor 102*a*). However, in other embodiments, the MIMO radio may be located internal to the structure 100 and/or may be located away from the base of the structure 100.

The MIMO radio 210 includes a first branch connector 203 and a second branch connector 205. The first branch connector 203 is associated with a first communication branch (which may be referred to as branch A) of the MIMO radio 210 and the second branch connector 205 is associated with a second communication branch (which may be referred to as branch B) of the MIMO radio 210.

In order to benefit from MIMO capabilities of the MIMO radio 210, a wireless communication device 201 must be within a coverage area of a first branch wireless signal 220 associated with the first branch (i.e. branch A) of the MIMO radio 210 and must also be within a coverage area of a second branch wireless signal 222 associated with a second branch (i.e. branch B) of the MIMO radio 210. As will be described in greater detail below, the in-building distributed antenna system 202 may be arranged so that, where a wireless signal associated with a branch does not originate on a given floor, that wireless signal associated with that branch will originate from an adjacent floor. Thus, when a wireless communication device 201 is within the coverage area of the in-building distributed antenna system 202, the wireless communication device 201 may receive a wireless signal associated with one branch from an antenna mounted on the floor on which the wireless communication device 201 is located and may receive a wireless signal associated with another branch from an antenna mounted on a floor which is adjacent to the floor on which the wireless communication device 201 is located.

In order to distribute signals sent and received from the MIMO radio 210 to other areas of the structure 100, the branch connectors are electrical connectors which are configured to connect to one or more wired transport mediums. More particularly, a first branch transport medium 204 is coupled to the first branch connector 203 of the MIMO radio 210 and a second branch transport medium 206 is coupled to the second branch connector 205 of the MIMO radio 210.

The first branch transport medium 204 includes a first branch backbone transport medium 208 which vertically distributes first branch signals sent and received from the first branch (i.e. branch A) of the MIMO radio 210 in the structure 100. Similarly, the second branch transport medium 206 includes a second branch backbone transport medium 209 which vertically distributes second branch signals sent and received from the second branch (i.e. branch B) of the MIMO radio 210 in the structure 100. In at least some example embodiments, the first branch backbone transport medium 208 may be referred to as first branch vertical cabling and the second branch backbone transport medium 209 may be referred to as second branch vertical cabling. While the first branch backbone transport medium 208 and the second branch backbone transport medium 209 are generally used to distribute the first branch signals and second branch signals vertically (i.e. to distribute these signals to other floors), these backbone transport mediums 208, 209 may have a horizontal component to their direction. For example, the backbone transport mediums 208, 209 may include one or more jogs which may result from the design of the structure 100. Accordingly, the backbone transport mediums 208, 209 may, to some extent, distribute the first branch signals and the second branch signals horizontally.

In at least some example embodiments, the backbone transport mediums 208, 209 are comprised of coaxial cabling. In other example embodiments, other types of cabling (such as fibre optic cabling) may be used. The backbone transport medium 208, 209 may be routed through an electrical conduit in the structure 100.

The first branch transport medium 204 further includes one or more first branch floor distribution transport mediums 240 and the second branch transport medium 206 further includes one or more second branch floor distribution transport mediums 242. To enhance the clarity of FIG. 2, only one first branch floor distribution transport medium 240 has been labelled (i.e. the first branch floor distribution transport medium 240 on the sixth floor 120*f*) and one second branch floor distribution transport medium 242 has been labelled (i.e. the second branch floor distribution transport medium 242 on the fifth floor 102*e*). In FIG. 3, a plurality of first branch floor distribution transport mediums 240 and second branch floor distribution transport mediums 242 have been labelled.

The first branch floor distribution transport mediums 240 are connected to the first branch backbone transport medium 208 using a suitable connector. Similarly, the second branch floor distribution transport mediums 242 are connected to the second branch backbone transport medium 209 using a suitable connector. The first branch floor distribution transport mediums 240 distribute the first branch signal, which is associated with the first branch of the MIMO radio 210, to other areas of a floor (i.e. areas on a floor which may be away from the first branch backbone transport medium 208). Similarly, the second branch floor distribution transport mediums 242 distribute the second branch signal, which is associated with the second branch of the MIMO radio 210, to other areas of a floor (i.e. areas which may be away from the second branch backbone transport medium 209). The floor distribution transport mediums 240, 242 are generally used to distribute signals to other areas of a floor (and not to other floors). In contrast, the backbone transport mediums 208, 209 are generally used to distribute signals to other floors.

In at least some example embodiments, the first branch floor distribution transport mediums 240 may be referred to as first branch horizontal cabling and the second branch floor distribution transport mediums 242 may be referred to as second branch horizontal cabling. While the first branch floor distribution transport mediums 240 and the second branch floor distribution transport mediums 242 are generally used to distribute the first branch signals and second branch signals horizontally (i.e. to distribute these signals to other areas of a floor), these floor distribution transport mediums 240, 242 may have a vertical component to their direction. For example, the floor distribution transport mediums 240, 242 may include one or more jogs which may result from the design of the structure 100. Accordingly, the floor distribution transport mediums 240, 242 may, to some extent, distribute the first branch signals and the second branch signals vertically.

In at least some example embodiments, the floor distribution transport mediums 240, 242 are comprised of coaxial cabling. In other example embodiments, other types of cabling (such as fibre optic cabling) may be used. The floor distribution transport mediums 240, 242 may be routed through an electrical conduit in the structure 100.

In at least some example embodiments, each floor distribution transport medium 240, 242 is associated with a separate one of the floors 102*a*, 102*b*, 102*c*, 102*d*, 102*e*, 102*f* of the structure 100. That is, each floor distribution transport mediums 240, 242 routes one of the branch signals to a separate one of the floors 102*a*, 102*b*, 102*c*, 102*d*, 102*e*, 102*f*.

The in-building distributed antenna system 202 further includes a plurality of antennas 230, 232. The antennas 230, 232 may, in at least some example embodiments, be ceiling mounted antennas which may be mounted on the ceiling associated with each floor 102*a*, 102*b*, 102*c*, 102*d*, 102*e*, 102*f*. In at least some example embodiments, the antennas 230, 232 may be omni-directional in-building antennas. By way of example and not limitation, in at least some example embodiments, the antennas 230, 232 may be CELLMAX-O-CPUSEi™ antennas which are manufactured by Cell-max™ which is a trademark of CommScope. The antennas 230, 232 may include electrical connectors for connecting the antennas to the transport mediums 204, 206. More particularly, the antennas 230, 232 may include electrical connectors for connecting the antennas to the floor distribution transport mediums 240, 242. The electrical connectors may, for example, be type N connectors which are threaded radio frequency (RF) connectors used to join coaxial cables.

The antennas 230, 232 include one or more first branch antenna 230 and one or more second branch antenna 232. The first branch antennas 230 are coupled to the first branch transport medium 204 and the second branch antennas 232 are coupled to the second branch transport medium 206. More particularly, the first branch antennas 230 are coupled to the first branch floor distribution transport mediums 240 and the second branch antennas 232 are coupled to the second branch floor distribution transport mediums 242.

In at least some example embodiments, the first branch antennas 230 and the second branch antennas 232 may be the same type of antenna. That is, in some example embodiments, the only difference between first branch antennas 230 and second branch antennas 232 is that first branch antennas are connected to the first branch transport medium 204 while second branch antennas are connected to the second branch transport medium 206. In at least some example embodiments, both the first branch antennas and the second branch antennas are commonly polarized antennas, such as vertically polarized antennas. In other example embodiments, the first branch antennas 230 may differ from the second branch antennas 232 in other aspects. For example, in at least some example embodiments, the first branch antennas 230 may be differently polarized than the second branch antennas 232. For example, the first branch antennas may be horizontally polarized antennas and the second branch antennas may be vertically polarized antennas. The use of differently polarized antennas may assist to differentiate first branch signals and second branch signals.

In order to reduce the amount of cabling required to form the first branch transport medium 204 and the second branch transport medium 206, the first branch antennas 230 are vertically interleaved with the second branch antennas 232 in the structure 100. As illustrated in FIGS. 2 and 3, the first branch antennas 230 are vertically interleaved with the second branch antennas 232 on a floor-wise basis. That is, the first branch antennas 230 and the second branch antennas 232 are distributed on alternating floors 102*a*, 102*b*, 102*c*, 102*d*, 102*e*, 102*f* of the structure 100. In at least some example embodiments, the antennas 230, 232 are distributed so that odd numbered floors contain only antennas associated with one branch and even numbered floors contain only antennas associated with the other branch. For example, in some embodiments, only first branch antennas 230 may be distributed on odd numbered floors and only second branch antennas 232 may be distributed on even numbered floors. That is, odd numbered floors may not contain any second branch antennas 232 and even numbered floors may not contain any first branch antennas. Similarly, in other embodiments, only first branch antennas 230 may be distributed on even numbered floors and only second branch antennas 232 may be distributed on odd numbered floors. In such embodiments, odd numbered floors may not contain any first branch antennas 230 and even numbered floors may not contain any second branch antennas 232.

Accordingly, in at least some example embodiments, the in-building distributed antenna system 202 may include a plurality of antennas 230, 232 comprising at least one first branch antenna 230 which is connected to the first branch transport medium 204 and at least one second branch antenna 232 which is connected to the second branch transport medium 206. At least one of the first branch antennas 230 is disposed on a floor of the structure 100 which does not have a second branch antenna 232 disposed thereon and at least one of the second branch antennas 232 is disposed on a floor of the structure 100 which does not have a first branch antenna 232 disposed thereon but which is within a coverage area of one of the first branch antennas 230.

The floors on which first branch antennas 230 are distributed may be referred to as first branch floors. In the example embodiment of FIGS. 2 and 3, the first branch floors are the even-numbered floors (i.e. the second floor 102*b* acts as a first first branch floor, the fourth floor acts as a second first branch floor 102*d* and sixth floor 102*f* acts as a third first branch floor). The floors on which second branch antennas 232 are distributed may be referred to as second branch floors. In the example embodiment of FIGS. 2 and 3, the second branch floors are the odd-numbered floors (i.e. the first floor 102*a* acts as a first second branch floor, the third floor 102*c* acts as a second second branch floor and fifth floor 102*e* acts as a third second branch floor). In the illustrated example embodiment, no second branch antennas 232 are distributed on a first branch floor and no first branch antennas 230 are distributed on a second branch floor.

In the example embodiment of FIGS. 2 and 3, on each floor all of the antennas on that floor provide a signal associated with only one branch. All antennas on a given floor provides only either a first branch wireless signal 220 or a second branch wireless signal 222 and is adjacent to a floor that provides the signal associated with the other branch. That is, a first branch floor, which provides a first branch wireless signal 220, is adjacent to at least one second branch floor 222 which provides the second branch wireless signal 222. Each floor includes either all first branch antennas or all second branch antennas. The first branch antennas 230 and the second branch antennas have a coverage area which includes at least a portion of the floor on which they are distributed and which also includes at least a portion of a floor which is adjacent to the floor on which they are distributed.

As illustrated in FIGS. 2 and 3, this arrangement permits a wireless communication device 201 located on one of the floors within the coverage area of the in-building distributed antenna system 202 to receive both a first branch wireless signal 220 and a second branch wireless signal 222. The signal associated with one of the branches is received from the floor where the wireless communication device 201 is located and the signal associated with the other one of the branches is received from an adjacent floor. The adjacent floor from which the signal associated with the other one of the branches is received may, depending on the design of the in-building distributed antenna system 202 and the location of the wireless communication device 201, be the floor above the floor where the wireless communication device 201 is located, the floor below the floor where the wireless communication device 201 is located, or both the floors above and below the floor where the wireless communication device 201 is located.

As illustrated in FIGS. 2 and 3, the first branch floor distribution transport mediums 240 and the second branch floor distribution transport mediums 242 are vertically interleaved in the structure 100. Accordingly, at least one floor contains a first branch floor distribution transport medium 240 but does not include a second branch floor distribution transport medium 242. The floor which includes a first branch floor distribution transport medium 240 but does not include a second branch floor distribution transport medium 242 is adjacent to at least one floor which includes a second branch floor distribution transport medium 242 but which does not include a first branch floor distribution transport medium 240.

More particularly, first branch floors (i.e. floors which contain first branch antennas 230 but not second branch antennas 232) may include only first branch floor distribution transport mediums 240 and may not include second branch floor distribution transport mediums 242. Similarly, second branch floors (i.e. floors which contain second branch antennas 232 but not first branch antennas 230) may include only second branch floor distribution transport mediums 242 and may not include first branch floor distribution transport mediums 240. That is, the first branch floor distribution transport mediums 240 and the second branch floor distribution transport mediums may be located on alternating floors of the structure 100.

By not including a floor distribution transport medium associated with every branch on every floor of the structure 100, the in-building distributed antenna system 202 may reduce the amount of cabling which is required to provide MIMO communications within the structure 100.

The in-building distributed antenna system 202 may include additional features apart from those specifically discussed above. For example, in at least some embodiment, the in-building distributed antenna system 202 may include one or more amplifiers, splitters, and/or connectors.

Furthermore, while the example wireless communications systems 110 are generally illustrated as cellular systems, the distributed antenna systems and the methods described herein may be used with other types of MIMO wireless communications systems 110 to provide wireless coverage within structures. For example, in at least some example embodiments, the in-building distributed antenna system 202 described herein may be used to provide wireless local area network (WLAN) coverage.

Figure 4:
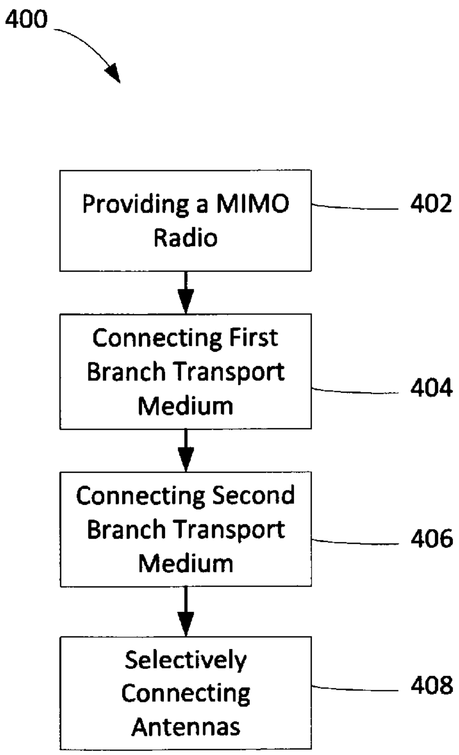
FIG. 4 is a flowchart of a method for providing wireless coverage in accordance with example embodiments of the present disclosure.

Referring now to FIG. 4, a flowchart of an example method 400 is illustrated. The method 400 of FIG. 4 illustrates an example embodiment of a method for providing wireless coverage within a coverage area which includes at least a portion of a structure 100 (FIGS. 1 to 3). The portion of the structure 100 includes at least a portion of two adjacent floors. Any of the components or features of the method 400 of FIG. 4 may be the same or analogous components to the components or features discussed above with reference to FIGS. 2 and 3.

First, at 402, a MIMO radio 210 (FIGS. 2 and 3) is provided. The MIMO radio 210 includes a first branch connector 203 and a second branch connector 205. The MIMO radio 210 may be connected to a communications sub-system 112 via wired or wireless transport mediums. The MIMO radio 210 includes a first branch connector and a second branch connector. The first branch connector 203 is associated with a first communication branch (which may be referred to as branch A) of the MIMO radio 210 and the second branch connector 205 is associated with a second communication branch (which may be referred to as branch B) of the MIMO radio 210.

Next, at 404, a first branch transport medium 204 may be connected to the first branch connector 203 of the MIMO radio 210. At 406, a second branch transport medium 206 may be connected to the second branch connector 205 of the MIMO radio 210.

At 408, one or more antennas are selectively connected to the first branch transport medium 204 to create one or more first branch antennas 230 and one or more antennas are selectively connected to the second branch transport medium 206 to create one or more second branch antennas 232. The antennas are selectively connected so that the first branch antennas 230 are vertically interleaved with the second branch antennas 232.

In at least some example embodiments, the antennas are selectively connected to the transport mediums to vertically interleave the antennas 230 connected to the first branch transport medium 204 with the antennas 232 connected to the second branch transport medium 206 on a floor-wise basis. That is, the antennas 230, 232 distributed on alternating floors may be alternatingly connected to either the first branch transport medium 204 on the second branch transport medium 206 so that the first branch antennas 230 and the second branch antennas 232 are distributed on alternating floors 102*a*, 102*b*, 102*c*, 102*d*, 102*e*, 102*f* of the structure 100.

In at least some example embodiments, the antennas 230, 232 on odd numbered floors are only connected to the transport medium 204, 206 associated with one branch of the MIMO radio 210 and the antennas 230, 232 on even numbered floors are only connected to the transport medium 204, 206 associated with another branch of the MIMO radio 210.

As discussed above, the floors on which first branch antennas 230 are distributed may be referred to as first branch floors. That is, the floors on which antennas are connected to the first branch transport medium 204 may be referred to as first branch floors. Similarly, the floors on which second branch antennas 232 are distributed and on which antennas are connected to the second branch transport medium 206 may be referred to as second branch floors. Accordingly, in at least some embodiments, the antennas distributed on a first branch floor are connected to the first branch transport medium 204 and the antennas distributed on a second branch floor, which is adjacent to the first branch floor, are connected to the second branch transport medium 206. In at least some such embodiments, no antennas on the first branch floor are connected to the second branch transport medium 206 and no antennas on the second branch floor are connected to the first branch transport medium.

In at least some example embodiments, the methods and systems described herein may be used to convert a single input single output (SISO) in-building distributed antenna system 502 into a multiple input multiple output (MIMO) in-building distributed antenna system 202, such as the multiple input multiple output (MIMO) in-building distributed antenna system 202 of FIGS. 2 to 3.

Figure 5:
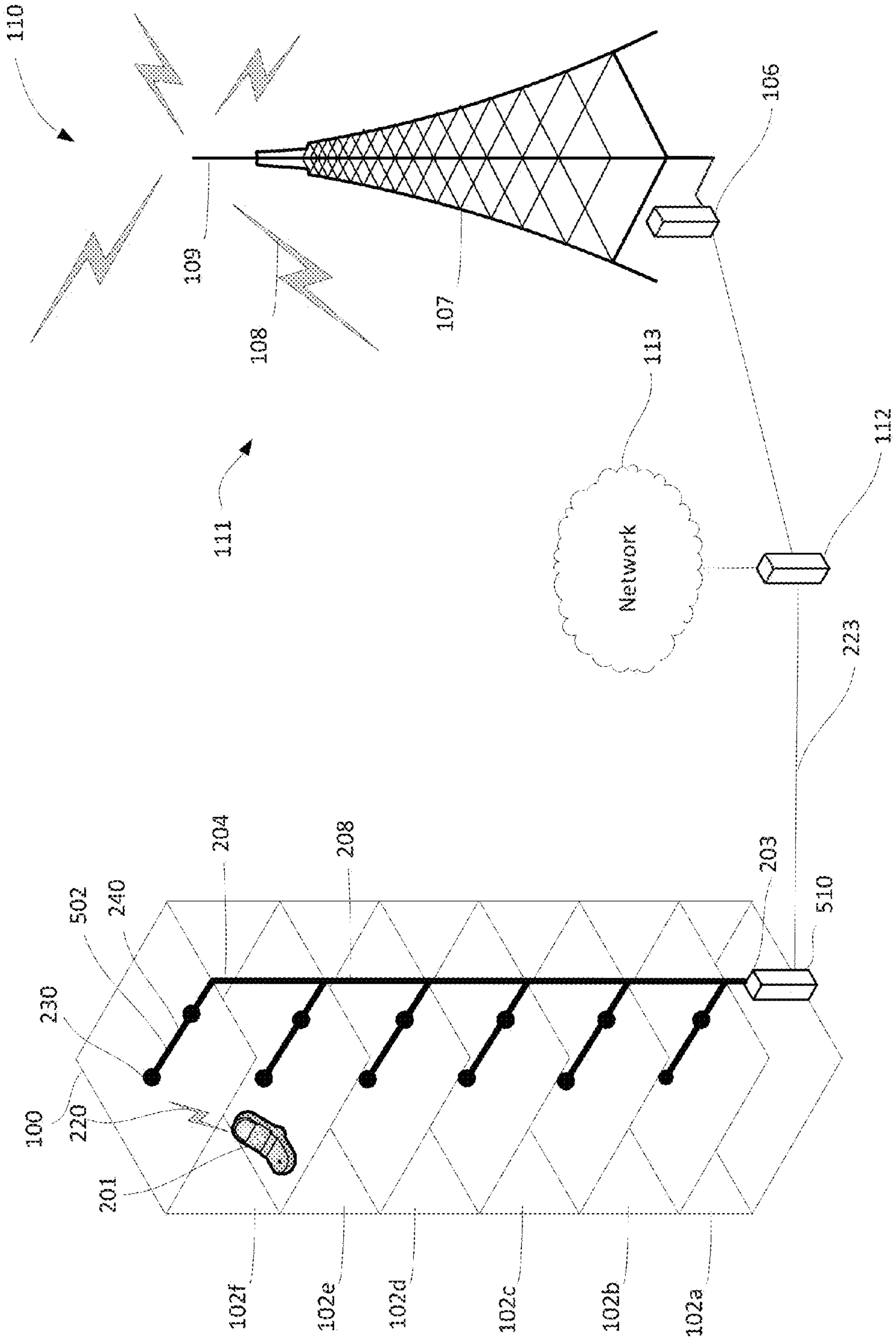
FIG. 5 is an isometric view of an operating environment illustrating a SISO in-building distributed antenna system.
Figure 6:
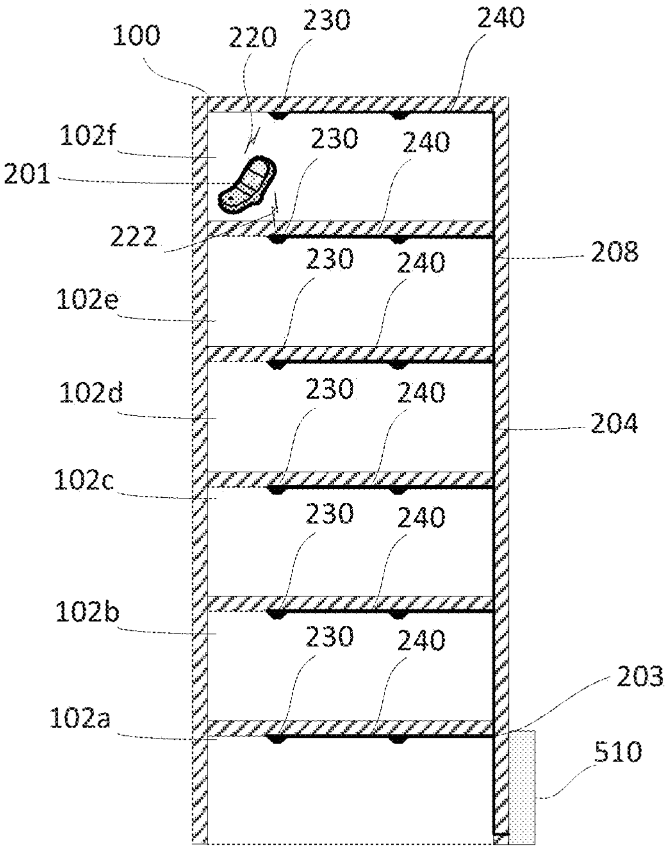
FIG. 6 is a front view of a structure illustrating the in-building distributed antenna system of FIG. 5.

An example of single input single output (SISO) in-building distributed antenna system 502 is illustrated in FIGS. 5 and 6. The SISO in-building distributed antennas system 502 may be used to distribute a SISO wireless signal to a structure 100 such as the structure described above with reference to FIG. 1. The SISO wireless signal may be generated by a wireless communications system 110 such as the wireless communications system 110 discussed above with reference to FIG. 1.

The SISO in-building distributed antennas system 502 includes a SISO radio 510 which may be connected to a communications sub-system 112 associated with the wireless communications system 110. Unlike the MIMO radio 210 of FIGS. 2 and 3, the SISO radio 510 of FIG. 5 only has a first branch connector. That is, the SISO radio 510 does not include a second branch connector associated with a second branch of the SISO radio 510 (since the SISO radio 510 has only a single branch).

The first branch connector 203 of the SISO radio 510 is connected to a first branch transport medium 204. The first branch transport medium 204 may include a first branch backbone transport medium 208 which is connected to the first branch connector 203. The first branch backbone transport medium 208 vertically distributes first branch signals sent and received from the first branch of the SISO radio 510 in the structure 100. The first branch backbone transport medium 208 may be similar to or the same as the first branch backbone transport medium 208 discussed in FIGS. 2 and 3 above with reference to the MIMO in-building distributed antenna system 202.

However, unlike some embodiments of the MIMO in-building distributed antenna system 202 of FIGS. 2 and 3, the SISO in-building distributed antenna system 202 includes first branch antennas 230 and first branch floor distribution transport mediums 240 on all floors, including adjacent floors. That is, in the SISO in-building distributed antenna system 202, a first branch floor distribution transport medium 240 is located on a floor which is adjacent to a floor containing another first branch floor distribution transport medium 240 and a first branch antenna 230 is distributed on a floor which is adjacent to a floor containing another first branch antenna 230.

More particularly, in the SISO in-building distributed antenna system 502, a plurality of first branch floor distribution transport mediums 240 connect to the first branch backbone transport medium 208 and to first branch antennas 230. At least some of the first branch floor distribution transport mediums 240 are located on floors which are adjacent to floors where first branch floor distribution transport mediums 240 are also located. Similarly, at least some of the first branch antennas 230 (i.e. the antennas which are indirectly connected to the first branch of the SISO radio 510) are located on floors which are adjacent to a floor having another one of the first branch antennas 230. That is, at least some of the plurality of floor distribution transport mediums which are connected to the first branch backbone medium are located on adjacent floors.

In the example embodiment illustrated in FIGS. 5 and 6, the SISO in-building distributed antenna system 502 includes a floor distribution transport medium 240 on each floor. Each of the floor distribution transport mediums 240 connects to the first branch backbone transport medium 208 and to first branch antennas 230.

An overview of a SISO in-building distributed antenna system 502 having been provided, reference will now be made to FIG. 7 which illustrates an example embodiment of a method 700 of converting a single input single output in-building distributed antenna system 502 (such as the SISO in-building distributed antenna system 502 of FIGS. 5 and 6) to a multiple input multiple output in-building distributed antenna system (such as the MIMO in-building distributed antenna system 202 of FIGS. 2 and 3). Any of the components or features of the method 700 of FIG. 7 may be the same or analogous components to the components or features discussed above with reference to FIGS. 2 and 3 and/or the components or features discussed above with reference to FIGS. 5 and 6.

In at least some example embodiments, at 702 the SISO radio 510 may be disconnected from the first branch backbone transport medium 208.

At 704, a MIMO radio 210 may be provided in the structure 100. The MIMO radio may be of the type described above with reference to FIGS. 2 and 3. The MIMO radio 210 may include at least two branch connectors, including a first branch connector 203 and a second branch connector 205.

At 706, the first branch backbone transport medium 208, which was formerly connected to the SISO radio 510, may be connected to the first branch connector 203 of the MIMO radio.

Similarly, at 708, a second branch backbone transport medium 209 may be connected to the second branch connector 203 of the MIMO radio 210. Since the SISO in-building distributed antenna system 502 does not rely on multiple branches, 708 may include running a second branch backbone transport medium 209 through the structure 100. Since the backbone transport mediums 208, 209 are used to vertically distribute branch signals, the second branch backbone transport medium 209 may be routed along a substantially vertical path. In at least some embodiments, the second branch backbone transport medium may be routed through an electrical conduit located in the structure 100.

At 710, floor distribution transport mediums 240 (such as those illustrated in FIGS. 5 and 6) are selectively disconnected from the first branch backbone transport medium 208 and connected to the second branch backbone transport medium 209. The floor distribution transport mediums 240 are selectively connected in a manner which vertically interleaves floor distribution transport mediums which are connected with the first branch backbone and floor distribution transport mediums which are connected with the second branch backbone. In at least some example embodiments, this may be done by disconnecting the floor distribution transport medium on every other floor from the first branch backbone transport medium 208 and connecting that disconnected floor distribution transport medium to the second branch backbone transport medium 209.

The MIMO in-building distributed antenna system described above has generally been described in relation to a two-by-two (2×2) MIMO implementation. A two-by-two (2×2) MIMO implementation is a system which uses two antennas at both a transmitter and a receiver. That is, the MIMO in-building distributed antenna system has two branches The systems and methods described herein may, however, be extended to MIMO systems with more than two branches. For example, in at least some example embodiments, the MIMO system may be a three-by-three (3×3) MIMO configuration. That is, the MIMO in-building distributed antenna system may have three branches, which may be referred to as branch A, branch B, and branch C.

Figure 8:
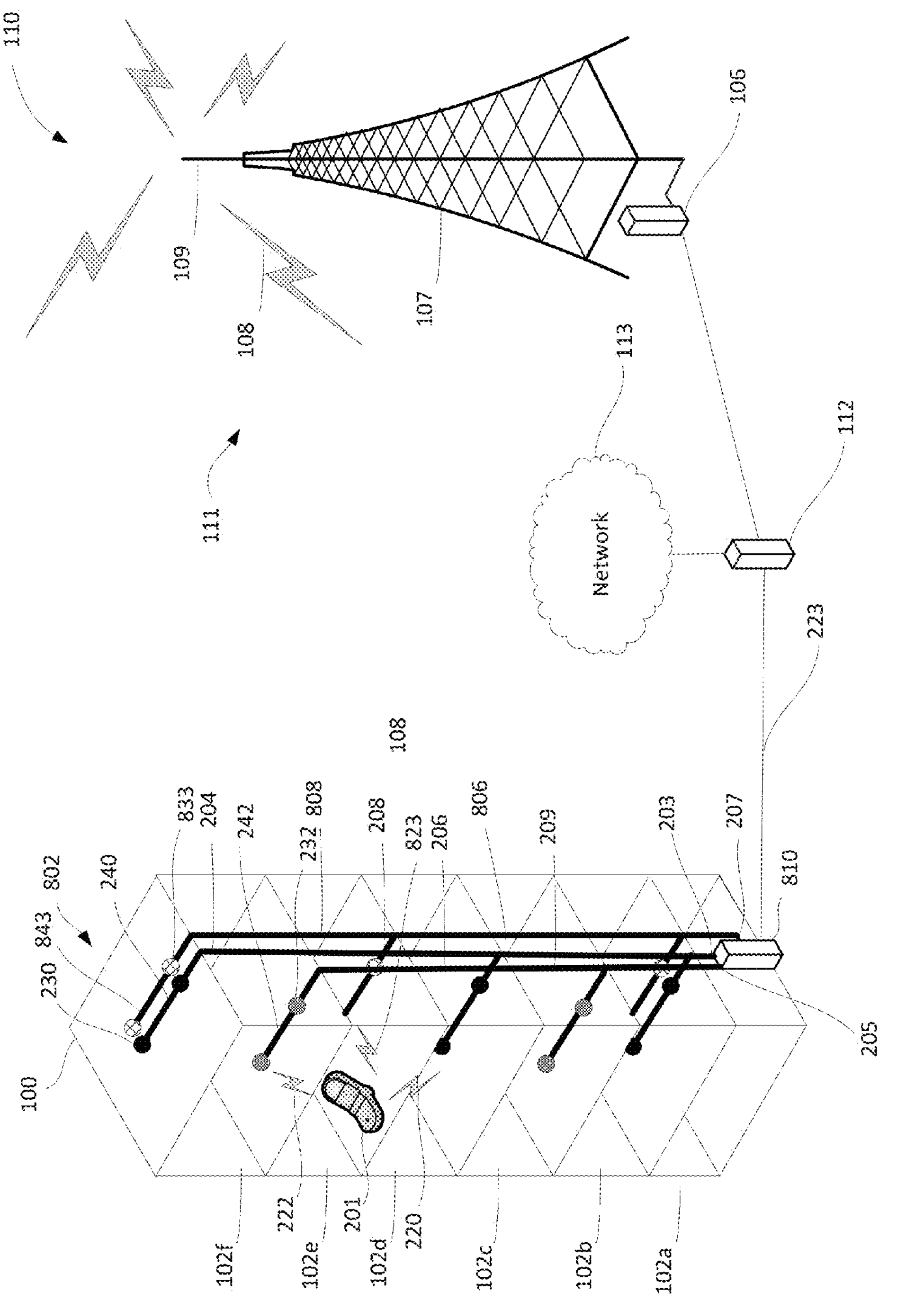
FIG. 8 is an isometric view of an operating environment illustrating a 3×3 MIMO in-building distributed antenna system in accordance with example embodiments of the present disclosure.

Referring now to FIG. 8, an example embodiment of a 3×3 MIMO in-building distributed antenna system 802 is illustrated. FIG. 8 illustrates a structure 100 in which, for the purpose of illustration, external walls have been removed. The 3×3 MIMO in-building distributed antenna system 802 may, in some example embodiments, be configured to provide wireless coverage to all internal areas of the structure 100. In other example embodiments, the in-building distributed antenna system 202 may provide wireless coverage within only a portion of the structure 100, such as, for example, a dead zone within the structure 100 where external communication sites 111 do not provide reliable wireless coverage.

The in-building distributed antenna system 802 includes a 3×3 MIMO radio 810. The 3×3 MIMO radio 810 may be connected to a communications sub-system 112, such as the communications sub-system 112 discussed above with reference to FIG. 1.

The 3×3 MIMO radio 810 includes three branch connectors: a first branch connector 203, a second branch connector 205, and a third branch connector 207. The first branch connector 203 is associated with a first communication branch (which may be referred to as branch A) of the 3×3 MIMO radio 810, the second branch connector 205 is associated with a second communication branch (which may be referred to as branch B) of the 3×3 MIMO radio 810, and the third branch connector 207 is associated with a third communication branch (which may be referred to as branch C).

In order to benefit from the 3×3 MIMO capabilities of the 3×3 MIMO radio 810, a wireless communication device 201 must be within a coverage area of a first branch wireless signal 220 associated with the first branch (i.e. branch A) of the 3×3 MIMO radio 810 and also within a coverage area of a second branch wireless signal 222 associated with the second branch (i.e. branch B) of the 3×3 MIMO radio 810 and must also be within a coverage area of a third branch wireless signal 823 associated with the third branch (i.e. branch C) of the 3×3 MIMO radio 810.

As in the embodiment of FIGS. 2 to 3, the in-building distributed antenna system 802 of FIG. 8 includes a first branch transport medium 204 which is coupled to the first branch connector 203 of the MIMO radio 810 and also includes a second branch transport medium 206 which is coupled to the second branch connector 205 of the MIMO radio 810. The in-building distributed antenna system 802 of FIG. 8 also includes a third branch transport medium 806 which is coupled to the third branch connector 207 of the MIMO radio 810.

In a manner which is similar to the 2×2 MIMO system of FIGS. 2 and 3, the first branch transport medium 204 includes a first branch backbone transport medium 208 which vertically distributes first branch signals sent and received from the first branch (i.e. branch A) of the 3×3 MIMO radio 810 in the structure 100. Similarly, the second branch transport medium also includes a second branch backbone transport medium 209 which vertically distributes second branch signals sent and received from the second branch (i.e. branch B) of the 3×3 MIMO radio 810 in the structure 100. The third branch transport medium 806 includes a third branch backbone transport medium 808 which vertically distributes third branch signals sent and received from the third branch (i.e. branch C) of the 3×3 MIMO radio 810 in the structure 100. The first branch backbone transport medium 208, the second branch backbone transport medium 209 and the third branch backbone transport medium 808 may be of the type discussed above with reference to the backbone transport mediums 208, 209 of FIGS. 2 and 3.

The first branch transport medium 204 includes one or more first branch floor distribution transport mediums 240 and the second branch transport medium 206 further includes one or more second branch floor distribution transport mediums 242. Similarly, the third branch transport medium 806 includes one or more third branch floor distribution transport mediums 843. The floor distribution transport mediums 240, 242, 843 are connected to respective backbone transport mediums 208, 209, 808 (i.e. the first branch floor distribution transport mediums 240 are connected to the first branch backbone transport medium 208, the second branch floor distribution transport mediums 242 are connected to the second branch backbone transport medium 209 and the third branch floor distribution transport mediums 843 are connected to the third branch backbone transport medium 808).

The floor distribution transport mediums 240, 242, 843 distribute branch signals to other areas of a floor (i.e. areas which are away from the area where the floor distribution transport mediums 240, 242, 843 connect to the backbone transport mediums 208, 209, 808).

The floor distribution transport mediums 240, 242, 843 may be wired connectors such as, for example, coaxial cabling.

The in-building distributed antenna system 802 further includes a plurality of antennas 230, 232, 833. The antennas 230, 232, 833 may be of the type discussed above with reference to FIGS. 2 and 3. However, in the embodiment of FIG. 8, at least some of the antennas 833 are connected to the third branch transport medium 806. Such antennas may be referred as third branch antennas.

The first branch antennas 230 (i.e. the antennas connected to the first branch transport medium 204) are vertically interleaved with the second branch antennas 232 (i.e. the antennas connected to the second branch transport medium 233) and are also vertically interleaved with the third branch antennas 833 (i.e. the antennas connected to the third branch transport medium 806).

More particularly, on at least some of the floors 102*a*, 102*b*, 102*c*, 102*d*, 102*e*, 102*f* of the structure 100, antennas 230, 232, 833 are distributed and connected so that the floor contains only antennas associated with one branch. A first branch floor (i.e. a floor which contains first branch antennas 230) is adjacent to a second branch floor (i.e. a floor which contains second branch antennas 232) and is also adjacent to a third branch floor (i.e a floor which contains third branch antennas 833). At least some of the floors only contain antennas associated with a single branch. In the embodiment illustrated, any floors which are not the top floor 102*f* or the bottom floor 102*a* include only antennas associated with one branch. That is, any floors which are adjacent to two floors, only include antennas associated with a single branch.

For example, in the illustrated example, the second floor 102*b* contains only second branch antennas 232 (which are illustrated as being mounted on the ceiling of the second floor). Similarly, the third floor 102*c* is illustrated to contain only first branch antennas 233 (which are illustrated as being mounted on the ceiling of the third floor) and the fourth floor 102*d* is illustrated to contain only third branch antennas 833 (which are illustrated as being mounted on the ceiling of the third floor). Similarly, the fourth floor 102*d* is illustrated to contain only second branch antennas 232 (which are illustrated as being mounted on the ceiling of the second floor).

In the example embodiment illustrated, to provide 3×3 MIMO coverage on floors which are adjacent to only one other floor (i.e. top floor 102*f* and the bottom floor 102*a*), antennas associated with two branches have been included on each of these two floors. On such floors, the antennas which are included are the antennas associated with a branch which is not associated with any antennas on the adjacent floor. For example, in the example illustrated the bottom floor includes first branch antennas 230 and third branch antennas 833 since the adjacent floor (i.e. the second floor 102*b*) includes second branch antennas 232. Similarly, in the example illustrated the top floor 102*f* includes first branch antennas 230 and third branch antennas 833 since the adjacent floor (i.e. the fifth floor 102*e*) includes second branch antennas 232.

In other example embodiments (not illustrated), the floors which are adjacent to only one other floor (i.e. the top floor 102*f* and the bottom floor 102*a*), may not include antennas associated with more than one branch. Instead, in at least some example embodiments, such floors may only include antennas associated with one branch. In such embodiments, only 2×2 MIMO coverage may be available on such floors.

Figure 7:
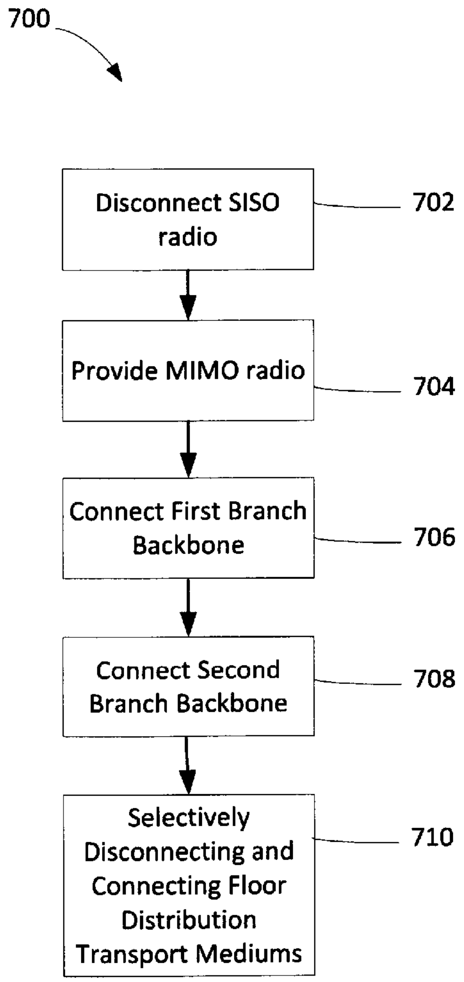
FIG. 7 is a flowchart of a method for converting a SISO in-building distributed antenna system to a multiple input multiple output (MIMO) in-building distributed antenna system.

In the example embodiment illustrated, the example methods 400 and 700 of FIGS. 4 and 7 respectively could be modified in order to provide methods for providing 3×3 MIMO. For example, the methods 400, 700 may include connecting a third branch transport medium coupled to the third branch connector of the 3×3 MIMO radio 810. Similarly, the methods 400, 700 may include connecting the antennas distributed on a third branch floor, which is adjacent to a second branch floor, to the third branch transport medium. In at least some such embodiments, no antennas on the third branch floor are connected to the second branch transport medium or to the first branch transport medium and no antennas on a first branch floor (which contains first branch antennas) and a second branch floor (which contains second branch antennas) are connected to the third branch transport medium. That is, the first branch floor and the second branch floor do not contain third branch antennas 833.

The techniques and systems described in the present disclosure may provide in-building distributed antenna systems in which branch-groups of antennas are vertically interleaved. Branch-groups are groups of antennas which may be associated with more than one branch. For example, an A-B branch-group of antennas may be a group of antennas which contains at least one antenna connected to a first branch transport medium 204 (i.e. first branch antennas 230) and at least one antenna connected to a second branch transport medium 206 (i.e. second branch antennas 232).

Accordingly, higher order MIMO systems, such as four by four (4×4), five by five (5×5), six by six (6×6), and so on, may vertically interleave branch groups of antennas.

By way of example, in at least some example embodiments, a 4×4 MIMO in-building distributed antenna system could include four branch transport mediums, each connecting to a separate branch connecter on a 4×4 MIMO radio. The branches could be grouped so that at least some floors include antennas associated with more than one branch but at least some floors do not include antennas associated with all branches. By way of example, a first branch antenna (i.e. an antenna connected to the first branch transport medium) could be grouped with a second branch antenna (i.e. an antenna connected to the second branch transport medium). Such a group may be referred to as an A-B branch group. A third branch antenna (i.e. an antenna connected to the third branch transport medium) could be grouped with a fourth branch antenna (i.e. an antenna connected to the fourth branch transport medium). Such a group may be referred to as a C-D branch group. The branch groups could be vertically interleaved in the structure 100 (FIG. 1) so that floors alternatingly include either an A-B branch group or a C-D branch group. For example, every odd numbered floor may include an A-B branch group (which includes at least one first branch antenna and at least one second branch antenna) and every even numbered floor may include a C-D branch group (which includes at least one third branch antenna and at least one fourth branch antenna). Alternatively, every even numbered floor may include an A-B branch group and every odd numbered floor may include a C-D branch group.

By way of further example, a 5×5 MIMO in-building distributed antenna system may include five branch transport mediums, each connecting to a separate branch connecter on a 5×5 MIMO radio. The branches could be grouped so that at least some floors include antennas associated with more than one branch but at least some floors do not include antennas associated with all branches. In some embodiments, there may be two branch groups, one which is associated with two branches and the other which is associated with three branches.

By way of example, a first branch antenna (i.e. an antenna connected to the first branch transport medium) could be grouped with a second branch antenna (i.e. an antenna connected to the second branch transport medium) and a third branch antenna (i.e. an antenna connected to the third branch transport medium). Such a group may be referred to as an A-B-C branch group. A fourth branch antenna (i.e. an antenna connected to the fourth branch transport medium) could be grouped with a fifth branch antenna (i.e. an antenna connected to the fifth branch transport medium). Such a group may be referred to as a D-E branch group. The branch groups could be vertically interleaved in the structure 100 (FIG. 1) so that floors alternatingly include either an A-B-C branch group or a D-E branch group. For example, every odd numbered floor may include an A-B-C branch group and every even numbered floor may include a D-E branch group. Alternatively, every even numbered floor may include an A-B-C branch group and every odd numbered floor may include a D-E branch group.

It will be appreciated that the interleaving of groups could be extended to provide in-building distributed antenna system of any MIMO order. For example, a 6×6 MIMO system could interleave an A-B-C branch group with a D-E-F branch group and each floor could alternatingly include one of these two groups.

The in-building distributed antenna system may also, in at least some example embodiments, vertically interleave more than two antenna groups. For example, in at least some embodiments, three branch groups may be formed and those branch groups may be alternatingly included on the floors of a building in a manner similar to the manner described with reference to FIG. 8. That is, any floors which are adjacent to two other floors could include antennas associated with one branch group. The adjacent floors to that floor could each include antennas associated with one of the other branch groups.

In the in-building distributed antenna systems, not all floors contain antennas associated with all branches. However, in at least some example embodiments, every floor which does not contain an antenna associated with a given branch is adjacent to a floor which contains an antenna associated with that branch. By not including antennas associated with all branches on all floors, the amount of cabling is reduced. However, MIMO communications remain available since all branches which are not available on a given floor are available on an adjacent floor.

In at least some example embodiments, the methods and systems described herein may be used to provide an in-building distributed antenna system in an event center. The event center may, in various embodiments, be a stadium, arena, concert hall or venue or opera house. In at least some embodiments, the event center may include a plurality of seating levels. In at least some example embodiments, an in-building distributed antenna system may be included in the event center. In such embodiments, first branch antennas may be vertically interleaved with second branch antennas on a level-wise basis. That is, in at least some embodiments, the first branch antennas and the second branch antennas are distributed on alternating levels of the event center. Each level may include only antennas associated with one branch. For example, a first level (which may be referred to as a 100 level) may include only antennas associated with a first branch and a second level (which may be referred to as a 200 level) which is adjacent to the first level, may include only antennas associated with a second branch.

As discussed above, in at least some of the embodiments described herein, antennas associated with different branches are separated by a physical structure or obstruction. For example, first branch antennas 230 (FIGS. 2 & 3) are separated from second branch antennas 232 (FIGS. 2 & 3) by a floor/ceiling. However, in at least some embodiments, the MIMO in-building distributed antenna systems described herein may be installed within a structure (such as an event center) which does not include multiple floors. That it, in some such embodiments, the first branch antennas and the second branch antennas may not have a floor between them. In at least some such embodiments, first branch antennas may be vertically interleaved with second branch antennas by vertically separating the antennas by a sufficient distance. In at least some embodiments, first branch antennas are vertically separated from second branch antennas by at least three meters.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An in-building distributed antenna system for providing wireless coverage within a coverage area which includes at least a portion of a structure with at least two floors, the in-building distributed antenna system comprising:

a multiple-input and multiple-output radio comprising a first branch connector and a second branch connector;

a first branch transport medium coupled to the first branch connector;

a second branch transport medium coupled to the second branch connector; and a plurality of antennas, the plurality of antennas comprising one or more first branch antennas coupled to the first branch transport medium and one or more second branch antennas coupled to the second branch transport medium, the first branch antennas being vertically interleaved with the second branch antennas in the structure such that a first branch floor is provided which includes only first branch antennas and a second branch floor is provided adjacent to the first branch floor, the second branch floor including only second branch antennas, and wherein at least one of the first branch floor and the second branch floor includes two or more antennas.

2. The in-building distributed antenna system of claim 1, wherein the portion of the structure includes at least a portion of two adjacent floors and wherein the first branch antennas are vertically interleaved with the second branch antennas in the structure, with the first branch antennas and the second branch antennas distributed on alternating floors of the structure.

3. The in-building distributed antenna system of claim 1, wherein one or more of the first branch antennas are distributed on a first branch floor on which no second branch antennas are distributed and one or more second branch antennas are distributed on a second branch floor which is adjacent to the first branch floor and on which no first branch antennas are distributed.

4. The in-building distributed antenna system of claim 3, wherein one or more of the first branch antennas are further distributed on a second first branch floor which is adjacent to the second branch floor and wherein the second first branch floor has no second branch antennas distributed thereon.

5. The in-building distributed antenna system of claim 3, wherein the multiple-input and multiple output radio further comprises a third branch connector and wherein the in-building distributed antenna system further comprises a third branch transport medium coupled to the third branch connector and wherein the plurality of antennas further comprise one or more third branch antennas coupled to the third branch transport medium, one or more of the third branch antennas being distributed on a third-branch-floor which is adjacent to the second branch floor and wherein the third branch floor has no first or second branch antennas distributed thereon and wherein the first branch floor and the second branch floor have no third branch antennas distributed thereon.

6. The in-building distributed antenna system of claim 1, wherein the first branch antennas and the second branch antennas have a coverage area which includes at least a portion of a floor on which they are distributed and which includes at least a portion of a floor adjacent to the floor on which they are distributed.

7. The in-building distributed antenna system of claim 1, wherein the first branch antennas are horizontally polarized antennas and the second branch antennas are vertically polarized antennas.

8. The in-building distributed antenna system of claim 1, wherein the first branch transport medium comprises a first branch backbone transport medium for vertically distributing a first branch signal associated with the MIMO radio and at least one first branch floor distribution transport medium connected to the first branch backbone transport medium for distributing the first branch signal to other areas of a floor and wherein the second branch transport medium comprises a second branch backbone transport medium for vertically distributing a second branch signal associated with the MIMO radio and at least one second branch floor distribution transport medium connected to the second branch backbone transport medium for distributing the first branch signal to other areas of a floor, the first branch floor distribution transport mediums being connected to first branch antennas and the second branch floor distribution transport mediums being connected to second branch antennas, and wherein at least one floor contains a first branch floor distribution transport medium and not a second branch floor distribution transport medium.

9. The in-building distributed antenna system of claim 8, wherein the first branch floor distribution transport mediums are vertically interleaved with the second branch floor distribution transport mediums.

10. The in-building distributed antenna system of claim 1, wherein the structure is an event center having a plurality of levels and wherein the first branch antennas and the second branch antennas are distributed on alternating levels of the event center.

11. The in-building distributed antenna system of claim 1, wherein the structure is an event center and wherein the first branch antennas are vertically separated from the second branch antennas by a distance of at least three meters.

12. A method of providing wireless coverage within a coverage area which includes at least a portion of a structure with at least two floors, the method comprising:

providing a multiple-input and multiple-output radio comprising a first branch connector and a second branch connector;

connecting a first branch transport medium to the first branch connector;

connecting a second branch transport medium to the second branch connector; and selectively connecting one or more antennas to the first branch transport medium to create one or more first branch antennas and selectively connecting one or more antennas to the second branch transport medium to create one or more second branch antennas which are vertically interleaved with the first branch antennas such that a first branch floor is provided which includes only first branch antennas and a second branch floor is provided adjacent to the first branch floor, the second branch floor including only second branch antennas, and wherein at least one of the first branch floor and the second branch floor includes two or more antennas.

13. The method of claim 12, wherein the portion of the structure includes at least a portion of two adjacent floors and wherein the antennas are selectively connected to the transport mediums to vertically interleave the antennas connected to the first branch transport medium with the antennas connected to the second branch transport medium.

14. The method of claim 13, wherein selectively connecting one or more of the antennas comprises connecting the antennas distributed on alternating floors to the first branch transport medium and the antennas distributed on any other floors to the second branch transport medium.

15. The method of claim 12, wherein selectively connecting one or more of the antennas comprises connecting the antennas distributed on a first branch floor to the first branch transport medium and connecting the antennas distributed on a second branch floor, which is adjacent to the first branch floor, to the second branch transport medium, and wherein no antennas on the first branch floor are connected to the second branch transport medium and no antennas on the second branch floor are connected to the first branch transport medium.

16. The method of claim 15, wherein selectively connecting one or more of the antennas further comprises connecting the antennas distributed on a second first branch floor, which is adjacent to the second branch floor, to the first branch transport medium.

17. The method of claim 15, wherein the multiple-input and multiple output radio further comprises a third branch connector, the method further comprising:

connecting a third branch transport medium coupled to the third branch connector; and connecting the antennas distributed on a third branch floor, which is adjacent to the second branch floor, to the third branch transport medium, and wherein no antennas on the third branch floor are connected to the second branch transport medium or the first branch transport medium and no antennas on the first branch floor or the second-branch-floor are connected to the third branch transport medium.

18. The method of claim 15, wherein the first branch antennas and the second branch antennas have a coverage area which includes at least a portion of a floor on which they are distributed and which includes at least a portion of a floor adjacent to the floor on which they are distributed.

19. The method of claim 12, wherein the first branch antennas are horizontally polarized antennas and the second branch antennas are vertically polarized antennas.

* * * * *